US009747041B2

(12) United States Patent
Geetha et al.

(10) Patent No.: US 9,747,041 B2
(45) Date of Patent: Aug. 29, 2017

(54) APPARATUS AND METHOD FOR A NON-POWER-OF-2 SIZE CACHE IN A FIRST LEVEL MEMORY DEVICE TO CACHE DATA PRESENT IN A SECOND LEVEL MEMORY DEVICE

(71) Applicant: INTEL CORPORATION, Santa Clara, CA (US)

(72) Inventors: Vedaraman Geetha, Fremont, CA (US); Henk G. Neefs, Palo Alto, CA (US); Brian S. Morris, Santa Clara, CA (US); Sreenivas Mandava, Los Altos, CA (US); Massimo Sutera, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 45 days.

(21) Appl. No.: 14/757,926

(22) Filed: Dec. 23, 2015

(65) Prior Publication Data
US 2017/0185315 A1     Jun. 29, 2017

(51) Int. Cl.
*G06F 12/00*     (2006.01)
*G06F 3/06*     (2006.01)
(Continued)

(52) U.S. Cl.
CPC .......... *G06F 3/0611* (2013.01); *G06F 3/068* (2013.01); *G06F 3/0638* (2013.01);
(Continued)

(58) Field of Classification Search
CPC .. G06F 12/121; G06F 12/127; G06F 12/0848; G06F 12/0864
See application file for complete search history.

(56) References Cited

U.S. PATENT DOCUMENTS 6,434,670 B1   8/2002  Arimilli et al.
8,612,676 B2   12/2013  Dahlen et al.
(Continued)

FOREIGN PATENT DOCUMENTS

EP   1265159 A2   12/2002

OTHER PUBLICATIONS

Notification of Transmittal of the International Search Report and Written Opinion of the International Searching Authority, or the Declaration dated Feb. 27, 2017, pp. 2, for Serial No. PCT/US2016/063427.

(Continued)

*Primary Examiner* — Matthew Bradley
(74) *Attorney, Agent, or Firm* — Konrad Raynes Davda & Victor LLP; David W. Victor (57) ABSTRACT

Provided are an apparatus and method for a non-power-of-2 size cache in a first level memory device to cache data present in a second level memory device having a $2^n$ cache size. A request is to a target address having n bits directed to the second level memory device. A determination is made whether a target index, comprising m bits of the n bits of the target address, is within an index set of the first level memory device. A determination is made of a modified target index in the index set of the first level memory device having at least one index bit that differs from a corresponding at least one index bit in the target index. The request is processed with respect to data in a cache line at the modified target index in the first level memory device.

25 Claims, 4 Drawing Sheets

(51) Int. Cl.
*G06F 12/0893* (2016.01)
*G06F 12/0866* (2016.01)

(52) U.S. Cl.
CPC ...... *G06F 12/0866* (2013.01); *G06F 12/0893* (2013.01); *G06F 2212/1021* (2013.01); *G06F 2212/205* (2013.01); *G06F 2212/2532* (2013.01); *G06F 2212/45* (2013.01); *G06F 2212/60* (2013.01)

(56) References Cited

U.S. PATENT DOCUMENTS

| | | | |
|---|---|---|---|
| 8,782,324 B1* | 7/2014 | Chen | G06F 12/0238 |
| | | | 711/102 |
| 8,868,842 B2* | 10/2014 | Yano | G06F 12/0246 |
| | | | 711/103 |
| 9,087,584 B2* | 7/2015 | Dahlen | G06F 12/0893 |
| 9,418,009 B2 | 8/2016 | Moga et al. | |
| 2004/0215888 A1 | 10/2004 | Arimilli et al. | |
| 2005/0063219 A1 | 3/2005 | Rolandi | |
| 2009/0187798 A1 | 7/2009 | Kim | |
| 2010/0169551 A1* | 7/2010 | Yano | G06F 12/0246 |
| | | | 711/103 |
| 2015/0178204 A1 | 6/2015 | Ray et al. | |

OTHER PUBLICATIONS

PCT International Search Report dated Feb. 27, 2017, pp. 3, for Serial No. PCT/US2016/063427.
Written Opinion of the International Searching Authority dated Feb. 27, 2017, pp. 6, for Serial No. PCT/US2016/063427.

\* cited by examiner

APPARATUS AND METHOD FOR A NON-POWER-OF-2 SIZE CACHE IN A FIRST LEVEL MEMORY DEVICE TO CACHE DATA PRESENT IN A SECOND LEVEL MEMORY DEVICE

TECHNICAL FIELD

Embodiments described herein generally relate to an apparatus and method for a non-power-of-2 size cache in a first level memory device to cache data present in a second level memory device.

BACKGROUND

A processor main memory may comprise two levels of memory, including a faster access first level smaller memory, such as a Dynamic Random Access Memory (DRAM) system, that caches data for a second level larger and slower memory. The second level memory is presented to the host and operating system as the main memory while the first level memory functions as the cache and is transparent to the operating system. The management of the two level memory (2LM) may be performed by a 2LM engine in the processor of the host.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

A two level main memory includes two levels of memory, including a faster access first level smaller volatile memory, such as a Dynamic Random Access. Memory (DRAM) system, that caches data for a second level larger and slower non-volatile memory, such as a byte addressable non-volatile random access memory (NVRAM). The first level memory may be referred to as a near memory and the second level memory may be referred to as a far memory. The first level memory typically provides a cache when the memory has a power-of-2 capacity, where the cache lines in the cache index implemented in the first level memory covers the power-of-2 capacity of the first level memory cache. The cache lines in the cache index are referenced by an index number and includes a tag having the most significant bits for second level memory addresses cached in the cache line. The number of index values of the cache lines is a power-of-2, calculated by dividing the power-of-2 cache size by the size of each cache line, also a power-of-2. In this way, all the $2^m$ index values may be specified in m bits of the address.

In certain situations, the first level memory device may not have a power-of-2 capacity available to use as the cache index of cache lines, such that the first level memory cache size is a non-power of 2 cache size. One way of addressing a non-power-of-2 cache size is to utilize a smaller power-of-2 region of the first level memory as the cache index. This technique is problematic because the region between the used small power-of-2 region and the full non-power-of-2 cache size is not available to use for the cache index to improve the cache hit ratio by maximizing the number of cache lines available in the cache index.

Described embodiments provide techniques for decoding a non-power-of-2 memory cache that is available for any non-power-of 2 cache size and for any cache line size. With described embodiments, upon receiving a request to a target address having n bits directed to a non-volatile memory, such as a second level memory, a determination is made as to whether a target index, comprising m bits of the n bits of the target address, is within an index set of the non-power-of-2 volatile memory device, comprising the first level memory. If the target index in the target address is outside of the available index set of the non-power-of-2 cache size, then a determination is made of a modified target index mapping to the index set of the first level memory device having at least one index bit that differs from a corresponding at least one index bit in the target index of the target address. The corresponding index bit from the target index that differs from the index bit in the modified target index is saved in a tag in a cache line at the modified target index in the first memory device. In this way, the target index is mapped to a location in the index set of the first level memory cache capacity, even though the cache manager operates as if it handles a power-of-2 cache size larger than the non-power-of-2 actual cache size of the first level memory.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
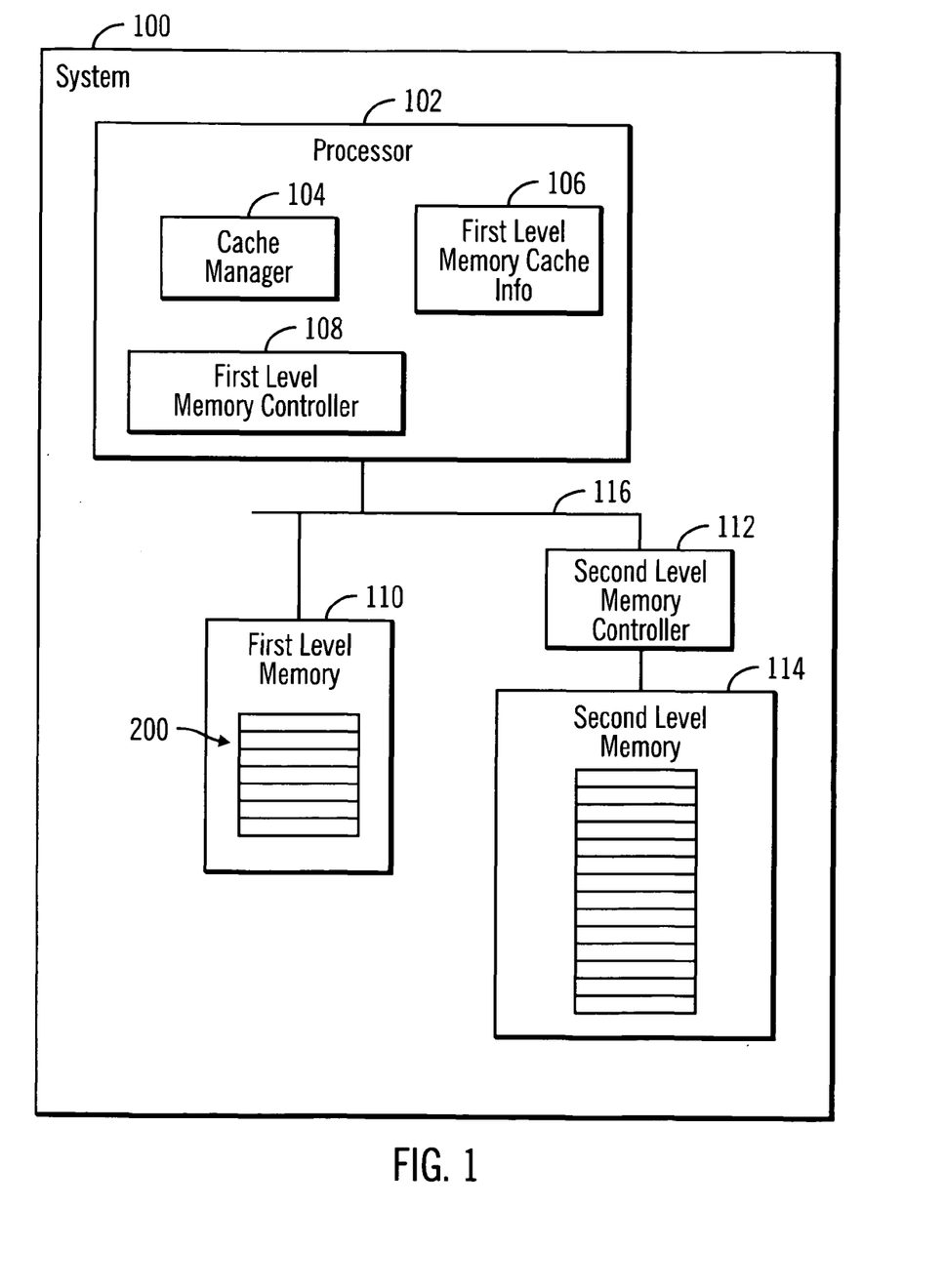
FIG. 1 illustrates an embodiment of a system having a two level memory used by a processor.

FIG. 1 illustrates an embodiment of a system 100 having a processor 102, a cache manager 104, first level memory cache information 106 used by the cache manager 104, and a first level memory controller 108 to interface with a first level memory 110, also referred to as a first memory device or cache. The cache manger 104 may also communicate with a second level memory controller 112 to access addresses in a second level memory 114, also referred to as a second memory device. The cache manager 104 may access the first level memory 110 and second level memory 114 over an interface 116, such as a Peripheral Component Interconnect (PCI) bus, such as the Peripheral Component Interconnect express (PCIe) bus, or any other custom bus.

The first level memory 110 and second level memory 114 may comprise a main memory of the processor 102, where the first level memory 110 operates as a cache for the second level memory 114, having cache lines 200 to cache data blocks from the second level memory 114. In one embodiment, the first level memory 110 cache lines 200 are direct mapped to addresses in the second level memory 114, with tags stored in the cache lines 200. The cache lines 200 may be indexed.

The first level memory 110 may have a smaller size and be a faster access memory than the second memory device or second level memory 114. In one embodiment, the first level memory 208 may comprise a Dynamic Random Access Memory (DRAM) that caches data in the second level memory 114, which may comprise a three dimensional cross point memory having more storage than the first level memory 110. The second level memory 114 may have a larger space than the first level memory 110, and comprise a solid state drive (SSD) or other type of storage or memory device, such as a three dimensional multilayer stacked cross point memory array. The second level memory 114 may implement other non-volatile memory types, such as NAND memory cells, ferroelectric random-access memory (FeTRAM), nanowire-based non-volatile memory, as phase change memory (PCM), memory that incorporates memristor technology, Magnetoresistive random-access memory (MRAM), Spin Transfer Torque (STT)-MRAM, Resistive Random Access Memory (ReRAM), byte addressable non-volatile RAM (NVRAM), etc.

The cache manager 104 determines whether data requested by the processor 102 using a second level memory address for the main memory is in the first level memory 110, and if not, the cache manager 104 fetches the requested data from the second level memory 114.

In one embodiment, the cache manager 104 may be part of a two level memory ("2LM") engine that manages a main memory for a processor having a near and second level memory devices. In a further embodiment, the cache manager 104 may be part of a combined caching agent and home agent configuration for caching data from a second level memory 114 in a first level memory 110, such as provided with the Intel Corporation QuickPath Interconnect logic. Other types of technologies and protocols may be used to implement the cache manager 104 to maintain a first level memory 110 as a cache for a larger second level memory 114.

The system 100 may also communicate with Input/Output (I/O) devices, which may comprise input devices (e.g., keyboard, touchscreen, mouse, etc.), display devices, graphics cards, ports, network interfaces, etc.

Figure 2:
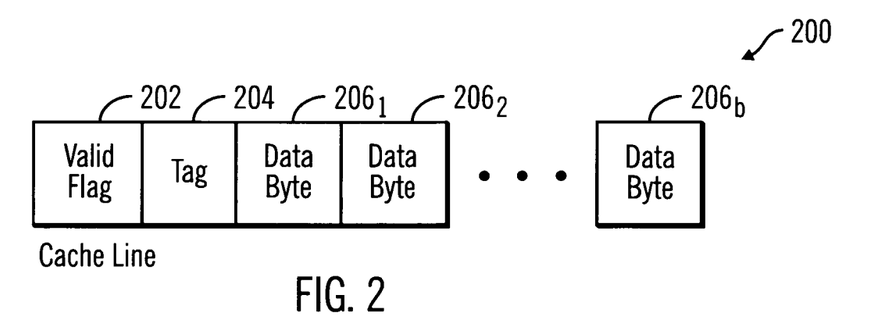
FIG. 2 illustrates an embodiment of components of an address directed to data in the second level memory.

FIG. 2 illustrates an embodiment of one of the cache lines $200_i$ at an index location in the cache lines 200 in the first level memory 200, and includes a valid flag 202 indicating whether the cache line $200_i$ has valid data; a tag 204 having tag bits used to form an address for the second level memory 114 when combined with the index location of the cache line $200_i$ in the cache lines 200; and one or more data bytes $206_1, 206_2 \ldots 206_b$, for each of the b separately addressable data words or bytes from the second level memory 114 that may be stored in one cache line $200_i$. In one embodiment the tag 204 may comprise one or more most significant bits of the index portion of the address and the at least one most significant bits following the index portion of the address.

In the described embodiments, the first level memory cache 110 provides a direct mapped cache. In, alternative embodiments, different caching techniques may be used to cache the data. Further, the cache line $200_i$ may include additional flags and bits to indicate different states of the data bytes $206_1, 206_2 \ldots 206_w$, such as dirty, etc.

Figure 3:
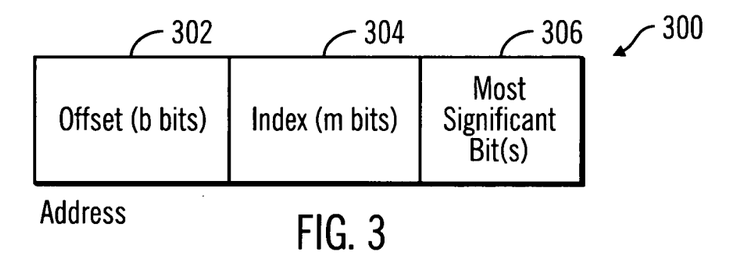
FIG. 3 illustrates an embodiment of a cache line in the first level memory.

FIG. 3 illustrates an embodiment of an address 300 used to address a location in the second level memory 114, and includes offset bits 302 comprising least significant bits of the address 300 that are used to identify a particular data byte $206_1, 206_2 \ldots 206b$ in the cache line $200_i$. The number of bits b in the offset 302 comprises the number of bits needed to identify each of the $2^b$ (or b) addressable data bytes in each cache line $200_i$. The address further includes m index bits 304 that are used to identify and locate each cache line, where there are $2^m$ cache lines 200 in the first level memory 110. The address 300 further includes one or more most significant bits 306 following the index bits 304 to complete the second level memory address 300. As discussed, the tag 204 may comprise one or more most significant bits of the index portion 304 of the address and the at least one most significant bits 306 following the index portion of the address.

Figure 4:
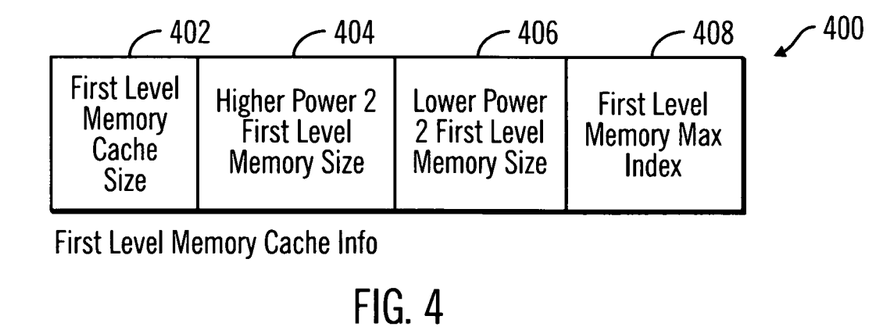
FIG. 4 illustrates an embodiment of first level memory cache information.

FIG. 4 illustrates an embodiment of first level memory cache information 400 used by the cache manager 104, and includes a first level memory cache size 402, which may have a non-power-of-2 size; a higher power-of-2 first level memory size 404 comprising a size $2^k$, such that k is a lowest integer value satisfying the condition that $2^k$ is greater than or equal to the first level memory cache size 402; a lower power-of-2 first level memory size 406 comprising a size $2^p$ such that p is a highest integer value satisfying the condition that $2^p$ is less than or equal to the first level memory cache size 402; and a first level memory maximum index 408 comprising a maximum index value within the index set of the first memory device comprising all index values to cache lines 200 within the first level memory 110.

If the higher power-of-2 memory size 404 is $2^k$, then the number of index bits 304 in the target address 300 comprises $2^k$ divided by a cache line size, indicating the total number of indexed cache lines in a theoretical higher power-of-2 first level memory size 440 greater than the actual non-power-of-2 first level memory 110.

Figure 5A:
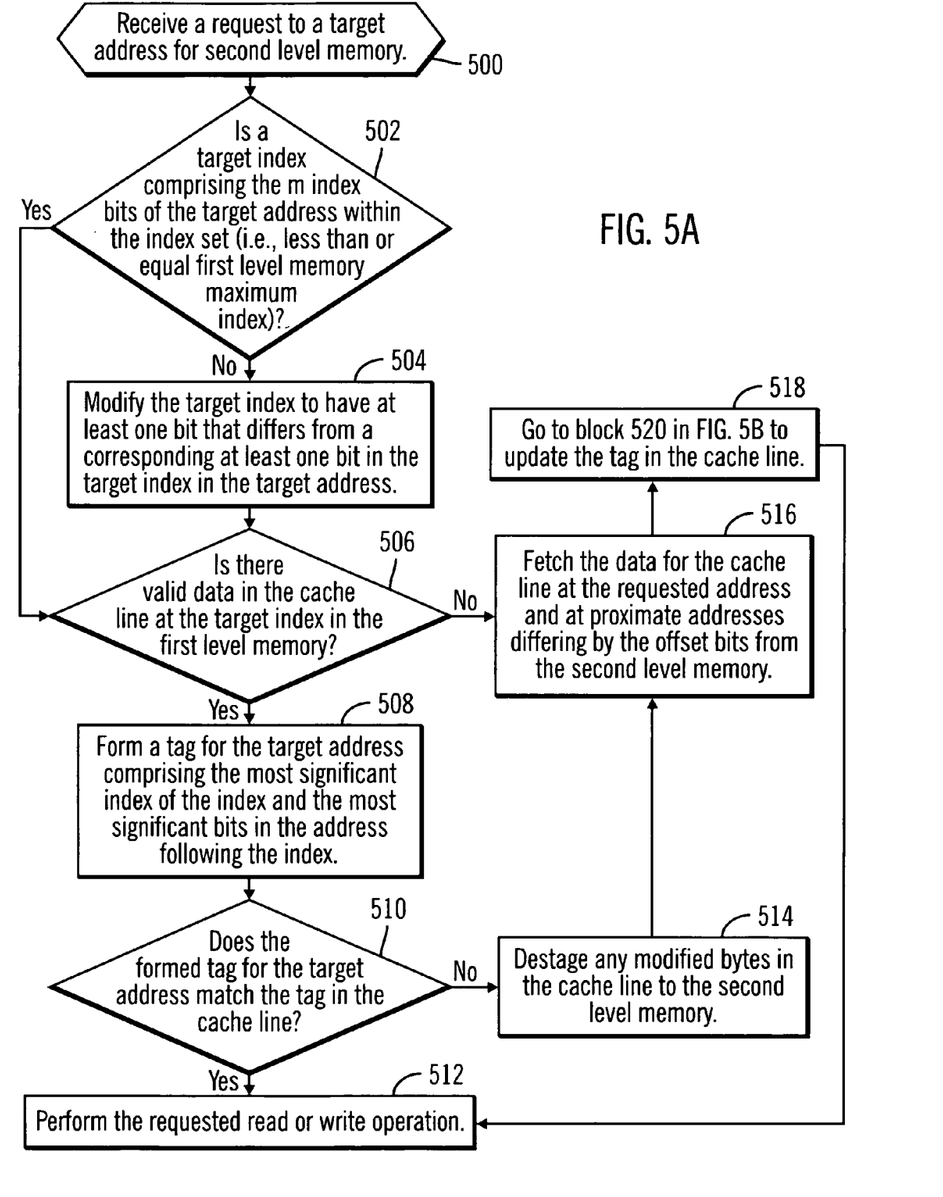
FIGS. 5a and 5b illustrate an embodiment of operations to cache data for the second level memory in the first level memory.
Figure 5B:
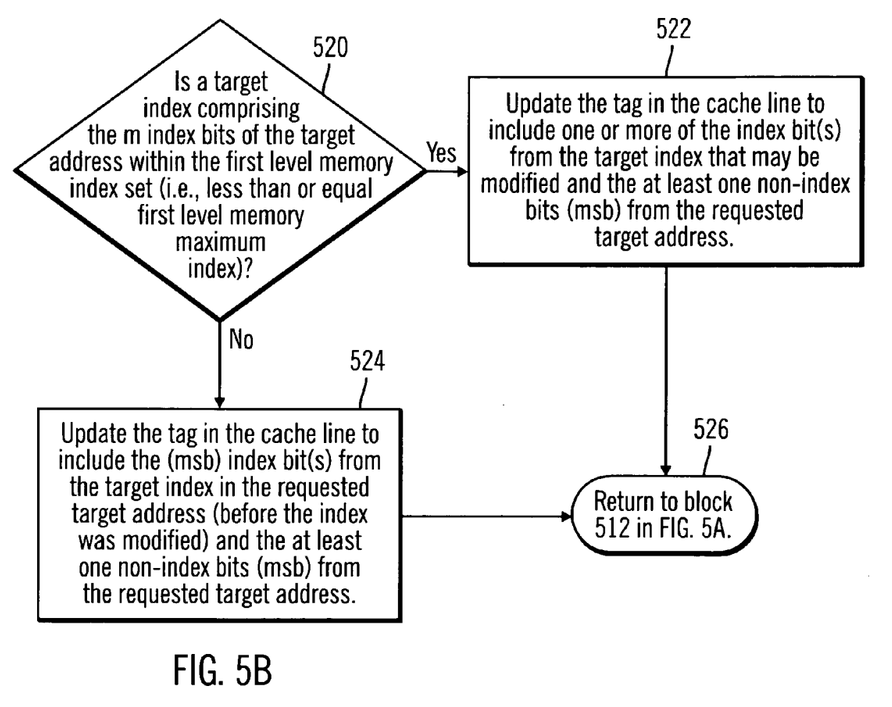

FIGS. 5a and 5b illustrate an embodiment of operations performed by the cache manager 104 to manage caching of data from the second level memory 114 in the first level memory 110. Upon receiving (at block 500) a request to an n bit target address 300 for the second level memory 114, the cache manager 104 determines (at block 502) whether a target index 304 comprising the m index bits 304 of the target address 300, for the theoretical higher power-of-2 first level memory size 404, is within the first level memory index set (i.e., less than or equal to the first level memory maximum index 408). If not, i.e., the target index 304 references an index entry not within the first level memory index set or cache lines 200, then the cache manager 104 modifies (at block 504) the target index to have at least one bit that differs from a corresponding at least one bit in the target index 304 in the target address. For instance, in one embodiment, at least one of the most significant bits of the target index 304 may be toggled to form a modified target index that maps to within the first level memory index set 200, i.e., cache lines 200 available in the non-power-of-2 near cache memory 110.

If (at block 506) there is valid data, as indicated by the valid flag 302, in the cache line $200_i$ at the target index, which may comprise the modified target index if modified at block 502, then the cache manager 104 forms (at block 508) a tag for the target address 300 comprising the most significant bit(s) of the index 304 and one or more most significant bits 306 of the address 300. The cache manager 104 then determines (at block 510) whether the formed tag from the target address 300 matches the tag 204 in the cache line $200_i$. This comparison operation at block 510 is performed to determine if the cache line $200_i$ has the data intended for the target address 300. This comparison is made because this cache line $200_i$ or index being considered is in a range of cache line indexes which could have data from different addresses in the second level memory 114 than requested, because some target addresses having an index 304 greater than the first level memory maximum index 408 will have their index 408 adjusted to map to a range in the first level memory cache, and also because the first level memory index 200 can cache one of multiple lines in the second level memory 114 which have the same set of first level memory index bits 304, but differ in one of the most significant tag bits 306. If (at block 510) there is a match, then the cache line $200_i$ has the data for the received target address 300, and the requested read or write operation is performed (at block 512) with respect to the data in the cache line $200_i$ at the modified index or target index 304 derived from the requested target address 300.

If (at block 510) the cache line $200_i$ at the index derived from the requested target address (modified index at block 504 or target index 304) does not have data for the requested target address, then the cache manager 104 destages (at block 514) any modified data $206_1$, $206_2$ . . . $206_b$ in the cache line $200_i$ to the second level memory 114. The cache manager 104 then fetches (at block 516) the data at the requested address 300 in the second level memory 114 and at proximate addresses in the second level memory 114 to store in the cache line $200_i$.

After fetching the data to store in the cache line $200_i$, control proceeds at (block 518) to block 520 in FIG. 5b to determine most significant index bit(s) to store in the tag 204 in the cache line $200_i$.

At block 520, the cache manager 104 determines whether the target index 304, comprising the m index bits of the target address 300, are within the first level memory index set, i.e., the index 304 is less than or equal first level memory maximum index 408. If so (at block 520), then the cache manager 104 updates (at block 522) the tag 204 in the cache line to include one or more of the most significant index bits (msb) from the target index 304 that are modified (at block 502) to produce the modified target index and the at least one most significant non-index bits 306 following the index 304 in the target address 300. If (at block 520) the target index 304 is not within the first level memory index set, i.e., is greater than the first level memory maximum index 408, then the cache manager 104 updates (at block 522) the tag 204 in the cache line $200_i$ to include the most significant index bit(s) from the target index 304 in the requested target address that would be subject to modification (at block 504) (before the index was modified) and the at least one non-index most significant bits 306 from the requested target address 300. After updating the tag 204 in the cache line $200_i$ at block 522 or 524, control returns (at block 526) to block 512 in FIG. 5a to complete the requested read or write operation.

If (at block 502) the target index 304 is within the first level memory index set, i.e., less than or equal to the first level memory maximum index 408, then control proceeds to block 506 to determine whether the cache line $200_i$ addressed by the target index value 304 has data for different target addresses in the second level memory 114. If (at block 506) there is no valid data in the cache line $200_i$ at the target index, then control proceeds to block 516 to fetch the data for the cache line at the requested address.

For instance, in one implementation, by way of example, the second level memory 114 may comprise 32 gigabytes (GB) having a 35 bit address size, the first level memory may have a non-power-of-2 12 GB size, and each cache line may be 64 bytes having 64 one byte words. In such case, the higher non-power-of-2 cache size 404 would be 16 GB, or $2^{34}$, divided by a 64 KB cache line size ($2^6$), which would result in $2^{28}$ cache lines having $2^{28}$ or 256 MB of index values. This means there would be six of the least significant bits available for the offset 302, for 64 addressable bytes in the cache line, 28 bits required for the index to address all 256 million entries, and then one most significant bit 306. If a target address has an index that addresses a cache line above 192 million (12 GB), then the most significant bit of the index, which forms part of the tag 204, needs to be toggled from a 1 to a 0 to map into a region of cache lines extending from 4 GB to 8 GB of the 16 GB first level memory cache. In such an example, the tag 204 stored in the cache line would include the most significant bit of the received second level memory address, or the $35^{th}$ bit, and the original most significant index bit, or the $34^{th}$ bit in the address. The index set of the 12 GB cache size would be the index value at 12 GB divided by 64 bytes.

With the described embodiments, an index set is used for a power-of-2 cache size greater than the actual non-power-of-2 cache size of the first level memory 110, but if a received address 300 includes an index that extends beyond the available index set of the non-power-of-2 cache size, then that index is mapped into the index set of the first level memory 110 into a cache line that may be used for index values in the target address within the index set of the non-power-of-2 cache.

The modified most significant index bits and the non-index tag bits may be different for different size second level memory addresses and for different numbers of cache lines in the first level memory, and for different types of caching techniques other than direct mapped caching.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as b, i, m, n, k, and p, are used herein to denote a variable number of instances of an element, which may represent the same or different values, and may represent the same or different value when used with different or the same elements in different described instances.

EXAMPLES

Example 1 is an apparatus for caching data subject to requests to target addresses, comprising: a first level memory device having a non-power of 2 cache size to cache data present in a second level memory device having a 2n size larger than the non-power of 2 cache size of the first level memory device; and a cache manager to: receive a request to a target address having n bits directed to the second level memory device; determine whether a target index, comprising m bits of the n bits of the target address, is within an index set of the first level memory device, wherein an index set of 2m is greater in size than the index set in the first level memory device; determine a modified target index in the index set of the first level memory device having at least one index bit that differs from a corresponding at least one index bit in the target index; and process the request with respect to data in a cache line at the modified target index in the first level memory device.

In Example 2, the subject matter of Examples 1 and 3-10 can optionally include that the determining the modified target index comprises toggling the corresponding at least one index bit in the target index to produce the at least one index bit in the modified target index that differs from the corresponding at least one index bit in the target index.

In Example 3, the subject matter of Examples 1, 2 and 4-10 can optionally include that 2m is equal to 2k divided by a cache line size of cache lines in the first level memory device, where k comprises a lowest integer value such that 2k is greater than the non-power of 2 cache size.

In Example 4, the subject matter of Examples 1-3 and 5-10 can optionally include that the cache manager is further to: save the corresponding at least one index bit from the target index that differs from the at least one index bit in the modified target index in a tag in the cache line at the modified target index in the first level memory device.

In Example 5, the subject matter of Examples 1-4 and 6-10 can optionally include that the cache manager is further to: in response to determining that the target index is within the index set of the first level memory device, save in the tag the at least one index bit in the target index that would have been changed if the target index was not in the index set of the first level memory device.

In Example 6, the subject matter of Examples 1-5 and 7-10 can optionally include that the tag includes at least one of a most significant non-index bits of the target address and the at least one index bit in the target index that is modified if the target index is not within the index set of the first level memory device.

In Example 7, the subject matter of Examples 1-6 and 8-10 can optionally include that the target address further includes b offset bits to address each of a 2b data bytes in the cache line, wherein the tag includes (n-m-b) of the most significant non-index bits of the target address and the at least one most significant index bit in the target index that is modified if the target index is not within the index set of the first level memory device, wherein the tag includes the at least one most significant index bit when the target index is within and not within the index set of the first level memory device.

In Example 8, the subject matter of Examples 1-7, 9, and 10 can optionally include that the cache manager is further to: form a formed tag for the target address comprising at least one most significant bit from the target index and at least one most significant bit of the target address following the target index; determine whether the formed tag matches the tag in the cache line at the modified target index; fetch data at the target address in the second level memory device to store in the cache line in response to determining that the formed tag not match the tag in the cache line; and process the request in response to the fetching of the data.

In Example 9, the subject matter of Examples 1-8 and 10 can optionally include that the cache manager is further to process the requested with respect to the data in the cache line in response to determining that the formed target tag matches the tag in the cache line.

In Example 10, the subject matter of Examples 1-9 can optionally include that the first level memory device comprises a volatile memory device and the second level memory device comprises a byte addressable non-volatile random access memory device.

Example 11 is a system for caching data subject to requests to target addresses, comprising: a processor having a cache manager; a main memory for the processor including a first level memory device and a second level memory device, wherein the first level memory device caches data for the second level memory device, and wherein the first level memory device has a non-power of 2 cache size to cache data present in the second level memory device having a 2n size larger than the non-power of 2 cache size of the first level memory device; and a cache manager to: receive a request to a target address having n bits directed to the second level memory device; determine whether a target index, comprising m bits of the n bits of the target address, is within an index set of the first level memory device, wherein an index set of 2m is greater in size than the index set in the first level memory device; determine a modified target index in the index set of the first level memory device having at least one index bit that differs from a corresponding at least one index bit in the target index; and process the request with respect to data in a cache line at the modified target index in the first level memory device.

In Example 12, the subject matter of Examples 11 and 13-18 can optionally include that the determining the modified target index comprises toggling the corresponding at least one index bit in the target index to produce the at least one index bit in the modified target index that differs from the corresponding at least one index bit in the target index.

In Example 13, the subject matter of Examples 11, 12, and 14-18 can optionally include that the cache manager is further to: save the corresponding at least one index bit from the target index that differs from the at least one index bit in the modified target index in a tag in the cache line at the modified target index in the first level memory device.

In Example 14, the subject matter of Examples 11-13 and 15-18 can optionally include that the cache manager is further to: in response to determining that the target index is within the index set of the first level memory device, save in the tag the at least one index bit in the target index that would have been changed if the target index was not in the index set of the first level memory device.

In Example 15, the subject matter of Examples 11-14 and 16-18 can optionally include that the tag includes at least one of a most significant non-index bits of the target address and the at least one index bit in the target index that is modified if the target index is not within the index set of the first level memory device.

In Example 16, the subject matter of Examples 11-15, 17, and 18 can optionally include that the target address further includes b offset bits to address each of a 2b data bytes in the cache line, wherein the tag includes (n-m-b) of the most significant non-index bits of the target address and the at least one most significant index bit in the target index that is modified if the target index is not within the index set of the first level memory device, wherein the tag includes the at least one most significant index bit when the target index is within and not within the index set of the first level memory device.

In Example 17, the subject matter of Examples 11-16 and 18 can optionally include that the cache manager is further to: form a formed tag for the target address comprising at least one most significant bit from the target index and at least one most significant bit of the target address following the target index; determine whether the formed tag matches the tag in the cache line at the modified target index; fetch data at the target address in the second level memory device to store in the cache line in response to determining that the formed tag not match the tag in the cache line; and process the request in response to the fetching of the data.

In Example 18, the subject matter of Examples 11-17 can optionally include that the first level memory device comprises a volatile memory device and the second level memory device comprises a byte addressable non-volatile random access memory device.

Example 19 is a method for caching data subject to requests to target addresses, comprising: caching in a first level memory device, comprising a non-power of 2 cache size, data present in a second level memory device having a 2n size larger than the non-power of 2 cache size of the first level memory device; receiving a request to a target address having n bits directed to the second level memory device; determining whether a target index, comprising m bits of the n bits of the target address, is within an index set of the first level memory device, wherein an index set of 2m is greater in size than the index set in the first level memory device; determining a modified target index in the index set of the first level memory device having at least one index bit that differs from a corresponding at least one index bit in the target index; and processing the request with respect to data in a cache line at the modified target index in the first level memory device.

In Example 20, the subject matter of Examples 11 and 13-18 can optionally include at least any one of:

(1) wherein the determining the modified target index comprises toggling the corresponding at least one index bit in the target index to produce the at least one index bit in the modified target index that differs from the corresponding at least one index bit in the target index; and/or (2) wherein 2m is equal to 2k divided by a cache line size of cache lines in the first level memory device, where k comprises a lowest integer value such that 2k is greater than the non-power of 2 cache size; and/or (3) saving the corresponding at least one index bit from the target index that differs from the at least one index bit in the modified target index in a tag in the cache line at the modified target index in the first level memory device; and/or (4) in response to determining that the target index is within the index set of the first level memory device, saving in the tag the at least one index bit in the target index that would have been changed if the target index was not in the index set of the first level memory device; and/or (5) wherein the tag includes at least one of a most significant non-index bits of the target address and the at least one index bit in the target index that is modified if the target index is not within the index set of the first level memory device; and/or (6) wherein the target address further includes b offset bits to address each of a 2b data bytes in the cache line, wherein the tag includes (n-m-b) of the most significant non-index bits of the target address and the at least one most significant index bit in the target index that is modified if the target index is not within the index set of the first level memory device, wherein the tag includes the at least one most significant index bit when the target index is within and not within the index set of the first level memory device; and/or (7) forming a formed tag for the target address comprising at least one most significant bit from the target index and at least one most significant bit of the target address following the target index; determining whether the formed tag matches the tag in the cache line at the modified target index; fetching data at the target address in the second level memory device to store in the cache line in response to determining that the formed tag not match the tag in the cache line; and processing the request in response to the fetching of the data; and/or (8) processing the requested with respect to the data in the cache line in response to determining that the formed target tag matches the tag in the cache line; and/or (9) wherein the first level memory device comprises a volatile memory device and the second level memory device comprises a byte addressable non-volatile random access memory device.

Example 21 is an apparatus, comprising: means for caching in a first level memory device, comprising a non-power of 2 cache size, data present in a second level memory device having a 2n size larger than the non-power of 2 cache size of the first level memory device; means for receiving a request to a target address having n bits directed to the second level memory device; means for determining whether a target index, comprising m bits of the n bits of the target address, is within an index set of the first level memory device, wherein an index set of 2m is greater in size than the index set in the first level memory device; means for determining a modified target index in the index set of the first level memory device having at least one index bit that differs from a corresponding at least one index bit in the target index; and means for processing the request with respect to data in a cache line at the modified target index in the first level memory device.

In Example 22, the subject matter of Examples 21 can optionally include means for saving the corresponding at least one index bit from the target index that differs from the at least one index bit in the modified target index in a tag in the cache line at the modified target index in the first level memory device.

Example 23 is a machine-readable storage including machine-readable instructions, when executed, to implement a method or realize an apparatus or system as claimed in any preceding claim.

Example 24 is an apparatus comprising means to perform a method as claimed in any preceding claim.

What is claimed:

1. An apparatus, comprising:
a first level memory device having a non-power of 2 cache size to cache data present in a second level memory device having a $2^n$ size larger than the non-power of 2 cache size of the first level memory device; and
a cache manager to:
receive a request to a target address having n bits directed to the second level memory device;
determine whether a target index, comprising m bits of the n bits of the target address, is within an index set of the first level memory device, wherein an index set of $2^m$ is greater in size than the index set in the first level memory device;
determine a modified target index in the index set of the first level memory device having at least one index bit that differs from a corresponding at least one index bit in the target index; and
process the request with respect to data in a cache line at the modified target index in the first level memory device.

2. The apparatus of claim 1, wherein the determining the modified target index comprises toggling the corresponding at least one index bit in the target index to produce the at least one index bit in the modified target index that differs from the corresponding at least one index bit in the target index.

3. The apparatus of claim 1, wherein $2^m$ is equal to $2^k$ divided by a cache line size of cache lines in the first level memory device, where k comprises a lowest integer value such that $2^k$ is greater than the non-power of 2 cache size.

4. The apparatus of claim 1, wherein the cache manager is further to:
save the corresponding at least one index bit from the target index that differs from the at least one index bit in the modified target index in a tag in the cache line at the modified target index in the first level memory device.

5. The apparatus of claim 4, wherein the cache manager is further to:
in response to determining that the target index is within the index set of the first level memory device, save in the tag the at least one index bit in the target index that would have been changed if the target index was not in the index set of the first level memory device.

6. The apparatus of claim 4, wherein the tag includes at least one of a most significant non-index bits of the target address and the at least one index bit in the target index that is modified if the target index is not within the index set of the first level memory device.

7. The apparatus of claim 6, wherein the target address further includes b offset bits to address each of a $2^b$ data bytes in the cache line, wherein the tag includes (n-m-b) of the most significant non-index bits of the target address and the at least one most significant index bit in the target index that is modified if the target index is not within the index set of the first level memory device, wherein the tag includes the at least one most significant index bit when the target index is within and not within the index set of the first level memory device.

8. The apparatus of claim 4, wherein the cache manager is further to:
form a formed tag for the target address comprising at least one most significant bit from the target index and at least one most significant bit of the target address following the target index;
determine whether the formed tag matches the tag in the cache line at the modified target index;
fetch data at the target address in the second level memory device to store in the cache line in response to determining that the formed tag not match the tag in the cache line; and
process the request in response to the fetching of the data.

9. The apparatus of claim 8, wherein the cache manager is further to:
process the request with respect to the data in the cache line in response to determining that the formed target tag matches the tag in the cache line.

10. The apparatus of claim 1, wherein the first level memory device comprises a volatile memory device and the second level memory device comprises a byte addressable non-volatile random access memory device.

11. A system, comprising:
a processor having a cache manager;
a main memory for the processor including a first level memory device and a second level memory device, wherein the first level memory device caches data for the second level memory device, and wherein the first level memory device has a non-power of 2 cache size to cache data present in the second level memory device having a $2^n$ size larger than the non-power of 2 cache size of the first level memory device; and
a cache manager to:
receive a request to a target address having n bits directed to the second level memory device;
determine whether a target index, comprising m bits of the n bits of the target address, is within an index set of the first level memory device, wherein an index set of $2^m$ is greater in size than the index set in the first level memory device;
determine a modified target index in the index set of the first level memory device having at least one index bit that differs from a corresponding at least one index bit in the target index; and
process the request with respect to data in a cache line at the modified target index in the first level memory device.

12. The system of claim 11, wherein the determining the modified target index comprises toggling the corresponding at least one index bit in the target index to produce the at least one index bit in the modified target index that differs from the corresponding at least one index bit in the target index.

13. The system of claim 11, wherein the cache manager is further configured to:
save the corresponding at least one index bit from the target index that differs from the at least one index bit in the modified target index in a tag in the cache line at the modified target index in the first level memory device.

14. The system of claim 13, wherein the cache manager is further configured to:
in response to determining that the target index is within the index set of the first level memory device, save in the tag the at least one index bit in the target index that would have been changed if the target index was not in the index set of the first level memory device.

15. The system of claim 13, wherein the tag includes at least one of a most significant non-index bits of the target address and the at least one index bit in the target index that is modified if the target index is not within the index set of the first level memory device.

16. The system of claim 15, wherein the target address further includes b offset bits to address each of a $2^b$ data bytes in the cache line, wherein the tag includes (n-m-b) of the most significant non-index bits of the target address and the at least one most significant index bit in the target index that is modified if the target index is not within the index set of the first level memory device, wherein the tag includes the at least one most significant index bit when the target index is within and not within the index set of the first level memory device.

17. The system of claim 13, wherein the cache manager is further configured to:

form a formed tag for the target address comprising at least one most significant bit from the target index and at least one most significant bit of the target address following the target index;

determine whether the formed tag matches the tag in the cache line at the modified target index;

fetch data at the target address in the second level memory device to store in the cache line in response to determining that the formed tag not match the tag in the cache line; and process the request in response to the fetching of the data.

18. The system of claim 11, wherein the first level memory device comprises a volatile memory device and the second level memory device comprises a byte addressable non-volatile random access memory device.

19. A method, comprising:

caching in a first level memory device, comprising a non-power of 2 cache size, data present in a second level memory device having a $2^n$ size larger than the non-power of 2 cache size of the first level memory device;

receiving a request to a target address having n bits directed to the second level memory device;

determining whether a target index, comprising m bits of the n bits of the target address, is within an index set of the first level memory device, wherein an index set of $2^m$ is greater in size than the index set in the first level memory device;

determining a modified target index in the index set of the first level memory device having at least one index bit that differs from a corresponding at least one index bit in the target index; and processing the request with respect to data in a cache line at the modified target index in the first level memory device.

20. The method of claim 19, wherein the determining modified target index comprises toggling the corresponding at least one index bit in the target index to produce the at least one index bit in the modified target index that differs from the corresponding at least one index bit in the target index.

21. The method of claim 19, further comprising:

saving the corresponding at least one index bit from the target index that differs from the at least one index bit in the modified target index in a tag in the cache line at the modified target index in the first level memory device.

22. The method of claim 21, further comprising:

in response to determining that the target index is within the index set of the first level memory device, saving in the tag the at least one index bit in the target index that would have been changed if the target index was not in the index set of the first level memory device.

23. The method of claim 21, wherein the tag includes at least one of a most significant non-index bits of the target address and the at least one index bit in the target index that is modified if the target index is not within the index set of the first level memory device.

24. The method of claim 21, further comprising:

form a formed tag for the target address comprising at least one most significant bit from the target index and at least one most significant bit of the target address following the target index;

determine whether the formed tag matches the tag in the cache line at the modified target index;

fetch data at the target address in the second level memory device to store in the cache line in response to determining that the formed tag not match the tag in the cache line; and processing the request in response to the fetching of the data.

25. The method of claim 19, wherein the first level memory device comprises a volatile memory device and the second level memory device comprises a byte addressable non-volatile random access memory device.

* * * * *